Figure 1:
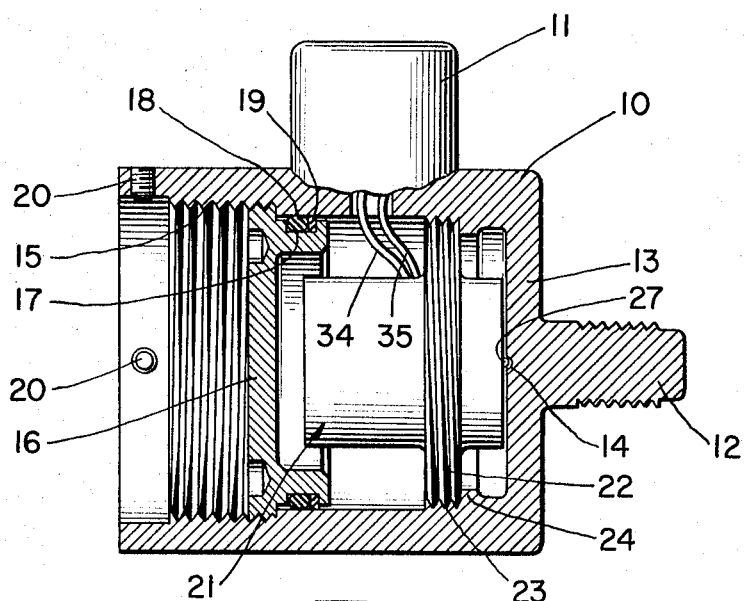

Jan. 31, 1967    S. G. NEVIUS    3,302,148
MECHANICAL LOAD CELL HAVING A SPRING BIASED SHAFT
Filed Nov. 23, 1965

INVENTOR.
SEARLE G. NEVIUS
BY
*Elliott & Pastoriza*
ATTORNEYS

United States Patent Office 3,302,148
Patented Jan. 31, 1967

3,302,148
MECHANICAL LOAD CELL HAVING A SPRING BIASED SHAFT
Searle G. Nevius, Playa Del Rey, Calif., assignor to W. C. Dillon & Company, Inc., a corporation of California
Filed Nov. 23, 1965, Ser. No. 509,392
5 Claims. (Cl. 336—30)

This application is a continuation-in-part of my co-pending United States patent application, Ser. No. 382,036, filed July 13, 1964, and entitled Load Cell.

This invention relates generally to force and load measuring devices, and more particularly to an improved load cell in which imposed forces are accurately transduced into an electrical measurement.

Although the load cell disclosed in my above-mentioned patent application adequately fulfills most operational requirements, it has certain characteristics which make initial calibration adjustments somewhat more difficult than desired. Certain other features are present requiring precise machining operations of the manufacture of the load cell.

With the foregoing in mind, it is accordingly a primary object of this invention to provide an improved load cell construction which is readily adjustable to insure highly accurate measurements of forces imposed thereon.

Another object is to provide a load cell embodying certain unique features of the load cell disclosed in my above-mentioned co-pending U.S. patent application which, in addition, includes features realizing more accurate force measurements than heretofore possible.

Another object is to provide an improved load cell construction capable of being manufactured with fewer precise machining operations than heretofore required.

Yet another object is to provide an improved load cell construction providing extremely accurate force measurements regardless of conditions such as misaligned force application and unusual shock loads.

Briefly, these and many other objects and advantages of this invention are attained by providing an improved load cell comprising a casing having a diaphragm or dome portion which is designed to flex under imposed loads. The loads may result from either compression, tension, or "push-pull" type applications.

Within the casing are mounted first and second electrical inductance windings in axially spaced opposing relationship. Interposed between the two windings is a common armature member, preferably disc-shaped.

A shaft means is disposed within the casing extending through the inductance windings and the armature member. The shaft means includes a spherical end portion adapted to engage the diaphragm or dome portion of the casing. The shaft means also includes means for coupling a portion thereof to the armature member for conjoint movement. Thus, movement imparted to the shaft means by the diaphragm or dome portion of the casing will, in turn, effect movement of the armature to vary the gaps between the armature and respective windings to thereby provide an electrical signal which constitutes a function of the force imposed on the diaphragm portion of the casing.

The electrical circuitry for the improved load cell of the present invention and the manner in which the variation of the air gaps and thus the flux in the respective windings is sensed and converted into an appropriate read-out form a part of applicant's co-pending application, Ser. No. 382,037, filed July 13, 1964, and entitled Electrical Load Cell.

Figure 2:
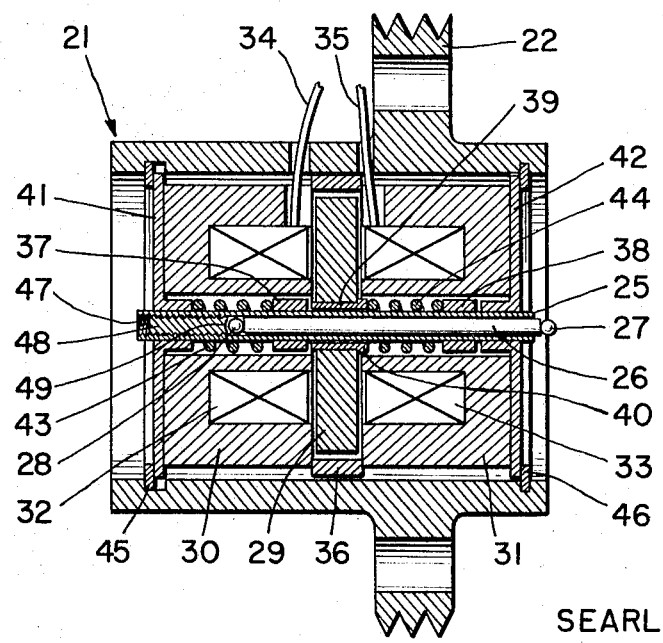

A better understanding of the invention will now be had by referring to a preferred embodiment thereof as illustrated in the accompanying drawings, in which:

FIGURE 1 is a sectional view of the improved load cell according to the present invention without showing the details of the sensing unit mounted therein; and, FIGURE 2 is a sectional view of the sensing unit embodied in the load cell construction of FIGURE 1.

Referring now to FIGURE 1, there is shown an improved load cell according to the present invention including a casing 10 and embodying an electrical connector structure 11 which also may house certain electrical components forming the subject matter of the above referred to co-pending application, Ser. No. 382,037.

Integrally formed with the casing 10 is a male threaded stud 12 which is designed for coupling to a force exerting member to either exert a compression or tension load on the stud 12 and in turn upon the related casing 10. The casing embodies a diaphragm or dome portion 13 which is designed to flex in response to a load imposed upon the male stud member 12. A semi-spherical depression or seat 14 is disposed in the diaphragm portion 13 facing the interior of the casing as shown. The purpose for this seat will become clear as the description proceeds.

The other end of the casing 10 must, of course, be provided with some type of means for holding it stationary while forces are imposed upon the stud 12. Towards this end, internal threads 15 are provided within the casing. These threads are also adapted to receive a sealing plate 16 which includes an annular groove 17 within which is mounted an O-ring 18 and a back-up ring 19 together forming a sealing means for a sensing unit within the casing. As an alternative or in conjunction with the threads 15, a set screw 20 is provided to lock the casing to a stationary member.

In accordance with an important feature of the invention, there is provided a sensor or sensing unit 21 coupled within the casing 10. The sensing unit 21 is preferably provided with an increased diameter portion or flange 22 threadedly connected at 23 to an internal part of the casing 10. In order to insure positive indexing of the flange 22 within the casing 10, a shoulder 24 is provided to limit the threaded position of the flange 22.

Referring now to the cross-section of the sensing unit 21 as illustrated in FIGURE 2, there is shown a shaft means which includes a tubular shaft 25 extending axially through the sensing unit. Axially disposed within the tubular shaft 25 is a rod 26 having spherical balls 27 and 28 secured to its respective ends. The rod-mounted ball 27 is designed to co-function with the spherical seat 14 disposed in the diaphragm 13 as shown in FIGURE 1 in a manner to be subsequently described.

Positioned within the sensor unit 21 is a disc-shaped armature member 29 axially interposed between a pair of cup-core members 30 and 31, respectively, housing inductor coils 32 and 33. The cup-core members are preferably formed of ceramic material.

The armature functions with the inductance coils to cause a variation in the magnetic flux in the respective inductors according to its axial position therebetween. In other words, movement of the armature away from its normal central position will vary the relative air gaps to increase the magnetic flux in one inductor and decrease the magnetic flux in the opposing inductor. This operation and the resulting conversion of this change in magnetic flux to an electrical quantity proportional to the force imposed is more clearly described in applicant's co-pending application, Serial No. 382,037. Towards this end, appropriate leads 34 and 35 lead from the coils 32 and 33 to the electrical connector 11 as shown in FIGURE 1.

A spacer member 36 is positioned in radially spaced relationship about the armature 29 and forms a positive means of indexing the inductor cup-core members 30 and 31 relative to the armature 29. The tubular shaft 25 has press-fitted thereon bushing members 37 and 38. The armature 29, as such, is mounted on a guide bushing 39 provided with a flange portion 40. The guide bushing 39 has an inner diameter greater than the outer diameter of the tubular shaft 25.

The ends of the tubular shaft 25 are journalled for sliding movement in end bushings 41 and 42, respectively. Interposed between the end bushing 41 and the bushing 37 is a spring member 43 which urges the tubular shaft 25 in a direction towards the right as viewed in FIGURES 1 and 2 or in a direction urging engagement of the ball 27 with the spherical seat 14 in the diaphragm 13. Encircling the tubular shaft 25 is another spring means 44 interposed between the guide bushing 39 and the bushing 38. Thus, the tubular shaft 25 is free to move axially with respect to the end bushings 41 and 42 and with respect to the guide bushing 39. The bushings 37 and 38 move axially with the shaft 25 since they are press-fitted thereon.

In order to retain the end bushings 41 and 42 as well as the inner parts of the sensing unit 21, retaining rings 45 and 46 may be appropriately provided near the ends of the sensing unit 21. The retaining rings 45 and 46 may be conventional split-ring type retaining members, for example, known by the trademark "Tru Arc."

An end of the tubular shaft 25 is internally threaded as shown at 47 to threadedly receive an adjustment screw 48 within the tubular shaft 25. The screw 48 is provided with a spherical seat 49 designed to cofunction with the ball 28 secured to the rod 26 in a manner to be subsequently described.

In assembly, the sensing unit 21 is threaded into the casing 10 by means of the threaded connection 23 until the flange 22 abuts the shoulder 24. This causes the ball 27 to be disposed adjacent to and in close proximity with the seat 14 in the diaphragm portion 13. The relative tension of the springs 43 and 44 is such that the armature 29 is initially disposed somewhat more closely to the coil 33 than to the coil 32.

To adjust the load cell to a "zero" or no-load setting, the screw 48 may be rotated within the threaded portion 47 of the tubular shaft 25 until the seat 49 engages the ball 28. Continued rotation of the screw 48 moves the rod 26 axially to the right as seen in FIGURE 2, thus moving the ball 27 into engagement with the seat 14 in the diaphragm portion 13. It will be apparent that continued rotation of the screw 48 against the rod 26 will cause the tubular shaft 25 to move towards the left, thus moving the armature to the left through the inter-connecting spring 44 and bushing 38. The armature 29 may thus be moved until it is equi-distantly spaced from or centered between the inductor coils 32 and 33, thereby obtaining a "zero" reading through the appropriate electrical connections.

To complete the assembly, the plate 16 is threaded into the casing 10 as shown in FIGURE 1.

The operation of the improved load cell according to the present invention will now be described.

Assuming a compressive load is applied to the male stud 12 and that suitable means are employed for coupling to the other end of the unit with the threads 15 or set screw 20 to resist movement of the load cell, the force imposed will tend to bow the diaphragm portion 13 of the cell casing 10 inwardly with the result that the ball 27 will correspondingly force the rod 26 inwardly and urge the tubular shaft 25 and the press-fitted bushings 37 and 38 in the same direction. In consequence, the spring means 44 will tend to force the guide bushing 39 and the armature 29 into closer axial disposition with respect to the inductor 30, 32 and away from the inductor 31, 33. Thus, the magnetic flux will increase with respect to the former and decrease with respect to the latter with an appropriate electrical signal being given through the leads 34 and 35 to the related components in the connector housing 11 and the connected read-out device.

In the event that a tensile force is exerted on the male stud 12 and assuming the other end of the load cell to be restrained against movement, the diaphragm portion 13 of the casing 10 will bow outwardly and permit the ball 27 to maintain its engagement with the seat 14 of the diaphragm portion 13. The tubular shaft 25 will thus be moved towards the right by the spring means 43 which engages the bushing 37 secured to the shaft 25 and urges this bushing into engagement with the armature 29. Thus, the armature 29 will move towards the inductor 31, 33 and away from the inductor 30, 32. Again, an appropriate signal will appear on the leads 34 and 35 and be indicated in the read-out device. The electrical components and circuitry sense the signals to reflect an indication of the force exerted on the load cell through the male stud 12 and the opposing end.

It will be noted that the flange portion 22 of the sensing unit 21 is threadedly connected to the inner sidewalls of the cell casing 10 at a point proximate the point at which the ball 27 engages the seat 14 of the diaphragm portion 13. Thus, in the event of any wide variation in temperature, no appreciable expansion or contraction of the casing 10 will, as such, affect the relative position of the armature 29 since the movement of the ball 27 in conjunction with the movement of the shaft 26 will be accompanied by relatively equal movement of the sensing unit 21. Thus, no substantial differential movement of the shaft means will occur with respect to the diaphragm portion 13 and no significant error will be introduced from these major components as a result of any temperature change.

Since the ball 27 engages the diaphragm portion 13 by means of a complementary fit with the spherical seat 14, it will be apparent that the load cell may be axially misaligned with respect to the imposed force and still attain relative accuracy since the cooperating ball and spherical seat will effectively reduce friction in that area. Thus, the cooperation of the ball 27 with the spherical seat 14 effectively enables axially misaligned forces to be translated into straight-line, axial movement of the rod 26, tubular shaft 25, and the associated armature 29. Moreover, the provision of the spherical seat 14 eliminates the requirement of drilling holes through the male stud 12 with consequent savings in expense of manufacture.

As a safety factor, it will be noted that the spring 44 functions as an over-travel spring to protect the armature from striking the inductor 30, 32 in the event any sudden compressive force is imposed upon the ball 27. In the event of an excessive tensile force, the diaphragm portion 13 will move away from the ball 27 such that no damage occurs to the unit.

It has been found that this load cell in one construction will yield an accuracy of 0.3 percent over a range of capacity varying from 100 pounds to 6,000 pounds, depending upon the thickness of the diaphragm portion 13. The actual total deflection is limited to .003 of an inch in order to obtain full scale reading. In consequence, it will be appreciated that the movement of the ball 27 is very slight to accomplish relative movement of the armature and the variation in the magnetic flux.

From the foregoing, it will be apparent that this invention provides an improved load cell capable of initial adjustments resulting in highly accurate readings of forces imposed thereon. Moreover, the rugged construction of the load cell enables it to sustain excessive shock loads with no damage to the sensing unit.

Various changes falling within the scope and spirit of this invention will occur to those skilled in the art. The load cell structure is, therefore, not to be thought of as limited to the specific embodiment set forth.

What is claimed is:

1. An improved load cell, comprising: a casing having a diaphragm portion designed to flex under load; a sensing unit mounted within said casing; shaft means extending axially within said sensing unit and having a spherical end portion; means in said diaphragm portion for receiving said spherical end portion in complementary relationship; electrical means in said sensing unit for sensing movement of said shaft means in response to movement of said diaphragm portion; adjustment means in said sensing unit for adjusting the axial position of said shaft means with respect to said electrical means; and biasing means in said sensing unit for maintaining said spherical end portion of said shaft means in engagement with said diaphragm portion.

2. The subject matter of claim 1, in which said electrical means includes a disc-shaped armature loosely received around said shaft means; and means for causing said armature to follow axial movement of said shaft means.

3. An improved load cell, comprising: a casing having a diaphragm portion designed to flex under load, said diaphragm portion including a semi-spherical seat facing the interior of said casing; a sensing unit mounted within said casing; first and second inductance coils mounted within said sensing unit, said inductance coils being axially spaced from each other in co-axial relationship; a common disc-shaped armature for said first and second inductance coils axially interposed in spaced relationship therebetween; shaft means extending axially through said armature and said inductance coils; spherical means secured to an end of said shaft means for engaging said semi-spherical seat on said diaphragm portion of said casing; means biasing said shaft means for maintaining said spherical means in engagement with said seat; means for causing said armature to follow movement of said shaft means; whereby movement of said diaphragm portion of said casing in turn effects movement of said shaft means and said armature to vary the flux relationship between said first and second inductance coils; and adjustment means mounted within said sensing unit for adjusting the position of said armature relative to said inductance coils.

4. An improved load cell, comprising: a casing having a diaphragm portion designed to flex under load, said diaphragm portion including a semi-spherical seat facing the interior of said casing; a sensing unit mounted within said casing; first and second inductance coils mounted within said sensing unit, said inductance coils being axially spaced from each other in co-axial relationship; a common disc-shaped armature for said first and second inductance coils axially interposed in spaced relationship therebetween; shaft means extending axially through said armature and said inductance coils; spherical means secured to an end of said shaft means for engaging said semi-spherical seat on said diaphragm portion of said casing; means biasing said shaft means for maintaining said spherical means in engagement with said seat; and means for causing said armature to follow movement of said shaft means, whereby movement of said diaphragm portion of said casing in turn effects movement of said shaft means and said armature to vary the flux relationship between said first and second inductance coils, said shaft means including a tubular member connected to said armature; and a rod axially positionable within said tubular member, said rod being integrally connected to said spherical means, whereby angular displacement of said diaphragm portion caused by the imposition of an axially misaligned load imparts movement to said rod in an axial direction to thereby impart axial movement to said tubular member and said armature.

5. The subject matter of claim 4, including an adjust-screw threadedly connected within said tubular member for engaging said rod, whereby said screw may be rotated to urge said rod against said diaphragm portion to thereby move said tubular member and said armature with respect to said inductance coils.

References Cited by the Examiner
UNITED STATES PATENTS

| | | | |
|---|---|---|---|
| 3,084,542 | 4/1963 | Statham | 73—141 |
| 3,092,995 | 6/1963 | Glerum | 73—141 |

LEWIS H. MYERS, *Primary Examiner.*

C. TORRES, T. J. KOZMA, *Assistant Examiners.*